US008585993B2

(12) United States Patent
Liu et al.

(10) Patent No.: US 8,585,993 B2
(45) Date of Patent: *Nov. 19, 2013

(54) METHOD FOR REGENERATING AMORPHOUS IRON OXIDE HYDROXIDE AND DESULFURIZER CONTAINING AMORPHOUS IRON OXIDE HYDROXIDE AS ACTIVE COMPONENT

(75) Inventors: Zhenyi Liu, Beijing (CN); Fengren Liu, Beijing (CN); Ke Lin, Beijing (CN)

(73) Assignee: Beijing Sanju Enviromental Protection and New Material Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/172,893

(22) Filed: Jun. 30, 2011

(65) Prior Publication Data

US 2011/0256039 A1    Oct. 20, 2011

Related U.S. Application Data

(63) Continuation of application No. PCT/CN2009/001598, filed on Dec. 30, 2009.

(30) Foreign Application Priority Data

Dec. 30, 2008 (CN) .......................... 2008 1 0247538
Dec. 30, 2008 (CN) .......................... 2008 1 0247539

(51) Int. Cl.
    *C01G 49/00*    (2006.01)
(52) U.S. Cl.
    USPC ........ 423/140; 423/141; 423/142; 423/567.1; 423/578.4
(58) Field of Classification Search
    USPC .............................. 423/140–142, 567.1, 578.4
    See application file for complete search history.

(56) References Cited

U.S. PATENT DOCUMENTS

| 7,037,876 B2 | 5/2006 | O'Brien et al. |
| 7,717,979 B2 | 5/2010 | Liu et al. |
| 2005/0123470 A1 | 6/2005 | Ayyer et al. |
| 2005/0247636 A1 | 11/2005 | Schlegel |
| 2008/0047395 A1 | 2/2008 | Liu et al. |
| 2008/0241055 A1 | 10/2008 | Kawase et al. |
| 2009/0169470 A1 | 7/2009 | Kawase |

FOREIGN PATENT DOCUMENTS

| CN | 1121950 | 5/1996 |
| CN | 1133817 | 10/1996 |
| CN | 1034422 | 4/1997 |
| CN | 1312132 | 9/2001 |
| CN | 1368537 | 9/2002 |
| CN | 1114462 | 7/2003 |
| CN | 1136045 | 1/2004 |
| CN | 1539545 | 10/2004 |
| CN | 1704144 | 12/2005 |
| CN | 101070491 | 11/2007 |
| CN | 101584962 | 5/2008 |
| CN | 101585556 | 11/2009 |
| CN | 101585557 | 11/2009 |
| CN | 101767828 | 7/2010 |
| EP | 0215505 | 3/1987 |
| EP | 0628339 | 6/1994 |
| EP | 1857414 | 11/2007 |
| GB | 838571 | 3/1957 |
| JP | 59039345 | 3/1984 |
| JP | 6262066 | 9/1994 |
| JP | 10259026 | 9/1998 |
| WO | WO 2006088083 | 8/2006 |
| WO | WO 2009/150232 | 12/2009 |
| WO | 2010/081290 | * 7/2010 |
| WO | WO 2010081290 | 7/2010 |

OTHER PUBLICATIONS

Liu et al., "Characterization for Iron Oxide Desulfurizer Active Component with High Sulfur Content" National Information Center of Gas Purification 2006 Technical Exchanges Proceedings, Dec. 2006, pp. 107-108.*
Translation of Liu, et al., "Characterization for Iron oxide Desulfurizer Active Component with High Sulfur Content", National Information Center of gas purification, Technical Exchanges Proceedings, Dec. 2006, pp. 107-108.*
Gong Zhi-jian et al., "Research on Desulfurization Activity of Iron Oxyhydroxide Prepared with Different Alkali Ratios", *Coal Science and Technology*, 34(10): 44-46 (2006).
Gong Zhi-jian et al., "Research on Desulfurization Activity of Iron Oxide Hydroxides Prepared with Different Methods", *Coal Conversion*, 29 (3):71-74 (2006).
Liu and Liu, "The Characterization of an Active Components in a kind of Iron Oxides Desulfurizer with High Sulfur Capacity",National Information Center of Gas Purification Proceedings on Technical Seminar. 2006, pp. 107-111.
Office Action mailed Aug. 16, 2012 for U.S. Appl. No. 13/172,898.
Response filed Feb. 15, 2013 for U.S. Appl. No. 13/172,898.
Office Action mailed Aug. 28, 2012 for U.S. Appl. No. 12/769,761.
Response filed Sep. 27, 2012 for U.S. Appl. No. 12/769,761.
Office Action mailed Oct. 12, 2012 for U.S. Appl. No. 12/769,761.
Response filed Feb. 12, 2013 for U.S. Appl. No. 12/769,761.
Office Action mailed Jun. 12, 2012 for U.S. Appl. No. 13/174,728.
Response filed Jul. 18, 2012 for U.S. Appl. No. 13/174,728.

(Continued)

*Primary Examiner* — Steven Bos
(74) *Attorney, Agent, or Firm* — Womble Carlyle Sandridge & Rice, LLP

(57) ABSTRACT

Methods for regenerating amorphous iron oxide hydroxide after being used as desulfurizer by (1) grinding a waste mixture into waste powder, wherein the waste mixture results from use of the composition comprising amorphous iron oxide hydroxide as desulfurizer; (2) preparing the waste powder into a suspension and charging the suspension with a gas containing oxygen to obtain a slurry comprising amorphous iron oxide hydroxide and elemental sulfur; and (3) placing the slurry or a solid resulting from filtering the slurry into a container and charging the slurry or the solid with air so that the elemental sulfur floats and the amorphous iron oxide hydroxide precipitates.

23 Claims, No Drawings

(56) References Cited

OTHER PUBLICATIONS

Office Action mailed Jul. 27, 2012 for U.S. Appl. No. 13/174,728.
Response filed Jan. 23, 2013 for U.S. Appl. No. 13/174,728.
Office Action mailed Mar. 31, 2009 for U.S. Appl. No. 11/805,727.
Response filed Jun. 30, 2009 for U.S. Appl. No. 11/805,727.
Final Office Action mailed Oct. 28, 2009 for U.S. Appl. No. 11/805,727.
Response to Final Office Action filed Dec. 14, 2009 for U.S. Appl. No. 11/805,727.
Restriction Requirement mailed Jun. 29, 2012 for U.S. Appl. No. 13/174,743.
Response to Restriction requirement filed Jul. 29, 2012 for U.S. Appl. No. 13/174,743.
Office Action mailed Aug. 14, 2012 for U.S. Appl. No. 13/174,743.
Response to Office Action filed Feb. 14, 2013 for U.S. Appl. No. 13/174,743.
Notice of Allowance for U.S. Appl. No. 11/805,727 mailed Jan. 7, 2010.
Issue Fee Transmittal for U.S. Appl. No. 11/805,727 filed Apr. 7, 2010.
Issue Notification for U.S. Appl. No. 11/805,727, mailed Apr. 28, 2010.
Supplementary European Search Report and Search Opinion for EPO application No. 09845385.5, dated Nov. 5, 2012.
Eurasian Patent Office Action dated Feb. 15, 2013, for EA application No. 20117143.
Multiple-Site Adsorption of Cd, Cu, Zn, and Pb on Amorphous Iron Oxyhydroxide, Mark M. Benjamin and James O. Leckie, "Journal of Colloid and Interface Science,", vol. 79, No. 1, Jan. 1981.
European Extended Search Report for application No. PCT/CN2009001598, dated Jun. 25, 2012.
European Extended Search Report for application No. PCT/CN2009001597, dated May 28, 2012.
European Extended Search Report for application No. PCT/CN2009001596, dated Jun. 25, 2012.
European Extended Search Report for application No. PCT/CN2009001595, dated Jun. 25, 2012.
European Extended Search Report for application No. PCT/CN2009001594, dated Nov. 11, 2012.
Eurasian Patent Office Action dated Feb. 15, 2013, for EA application No. 201170905.
Eurasian Patent Office Action dated Mar. 21, 2013, for EA application No. 201170839.
Eurasian Patent Office Action dated Jan. 17, 2013, for EA application No. 201170904.
Eurasian Patent Office Action dated Jan. 17, 2013, for EA application No. 201170903.
Eurasian Patent Office Action dated Feb. 15, 2013, for EA application No. 201171473.

\* cited by examiner

METHOD FOR REGENERATING AMORPHOUS IRON OXIDE HYDROXIDE AND DESULFURIZER CONTAINING AMORPHOUS IRON OXIDE HYDROXIDE AS ACTIVE COMPONENT

CROSS-REFERENCE TO RELATED APPLICATIONS

This application is a continuation of International Patent Application No. PCT/CN2009/001598, with an international filing date of Dec. 30, 2009, designating the United States, now pending, and further claims priority benefits to Chinese Patent Application No. 200810247539.1, filed Dec. 30, 2008 and Chinese Patent Application No. 200810247538.7, filed on Dec. 30, 2008. The contents of all of the aforementioned applications, including any intervening amendments thereto, are incorporated herein by reference.

BACKGROUND OF THE INVENTION

1. Field of the Invention

This invention relates to a method for regenerating amorphous iron oxide hydroxide after being used as desulfurizer and composition comprising amorphous iron oxide hydroxide after being used as desulfurizer.

2. Description of the Related Art

In the existing technologies especially in industrial application, it is rarely studied of preparation and regeneration of amorphous iron oxide hydroxide. and no regeneration or regeneration method of amorphous FeOOH is published.

However, some research is still in the laboratory of exploration stage. Regeneration of amorphous iron oxide hydroxide is very slow and lasts a long time in natural state. Therefore, the process is unsuitable for fast and mass production.

One vital objective of this study is to achieve the mass regeneration of amorphous iron oxide hydroxide after used in industrial production. If this point comes true it will be a great revolution in desulfurizer field and the followed shortcomings of the existing desulfurizer can be eliminated. Conventional desulfurizers cannot be regenerated (or regeneration is costly) so that large quantities of waste product must be buried. The technology not only wastes resources but also pollutes the environment.

SUMMARY OF THE INVENTION

In view of the above-described problems, it is one objective of the invention to provide a method for regenerating amorphous iron oxide hydroxide after being used as a desulfurizer that is suitable for fast and mass production.

It is another objective of the invention to provide a method for regenerating the high concentration composition of the amorphous iron oxide hydroxide after being used as a desulfurizer.

To achieve the above objectives, in accordance with one embodiment of the invention, a method is provided for regenerating amorphous iron oxide hydroxide after being used as a desulfurizer. The method comprises the steps of:

(1) grinding a waste mixture into waste powder, wherein the waste mixture results from the use of the composition comprising amorphous iron oxide hydroxide as desulfurizer;

(2) preparing the waste powder into a suspension and charging the suspension with a gas containing oxygen to obtain a slurry comprising amorphous iron oxide hydroxide and elemental sulfur; and (3) placing the slurry or a solid resulting from filtering the slurry into a container and charging the slurry or the solid with air so that the elemental sulfur floats and the amorphous iron oxide hydroxide precipitates.

Desulfurization and regeneration of the amorphous iron oxide hydroxide react according to the chemical reaction: $2FeOOH+3H_2S \rightarrow Fe_2S_3.H_2O+3H_2O$, $Fe_2S_3.H_2O+3/2O_2 \rightarrow 2FeOOH+3S$.

In a class of this embodiment, prior to grinding the waste mixture is washed with water. after step (3) the floated elemental sulfur is separated. The weight proportion of solid in the suspension prepared of step (2) is 5-30%, particularly 10-15%. The gas containing oxygen is air in step (2). In step (3), an auxiliary agent is added to the reactor to accelerate the floating and separation of the elemental sulfur. The auxiliary agent is water glass and kerosene. The container in step (3) is flotation tank. The waste mixture is ground into particles of size 100-400 mesh in step (1), particularly 200 mesh.

In a class of this embodiment, the method is applied to regeneration of a composition used amorphous iron oxide hydroxide as active ingredient after the composition is used as desulfurizer.

This invention provides a method of regenerating amorphous iron oxide hydroxide after being used as a desulfurizer, the method of comprising the following steps:

(a) grinding a waste mixture into waste powder, wherein, the waste mixture results from use of the amorphous iron oxide hydroxide as desulfurizer;

(b) preparing the waste powder into a suspension and charging the suspension with a gas containing oxygen to obtain a slurry comprising amorphous iron oxide hydroxide and elemental sulfur; and (c) filtering the slurry to yield a solid and extracting the elemental sulfur from the solid with a solvent to yield amorphous iron oxide hydroxide.

In a class of embodiment, prior to grinding, the waste mixture is washed with water. The elemental sulfur is separated after the extracting solvent is concentrated. The weight proportion of solid in the suspension prepared of step (b) is 5-30%, particularly 10-15%. The gas containing oxygen is air in step (b). The solvent is non polar solvent in step (c). The non-polar solvent is carbon tetrachloride or carbon disulfide. The waste mixture is ground into particles of size 100-400 mesh in step (a), particularly 200 mesh.

In a class of this embodiment, the method is applied to regeneration of a composition used amorphous iron oxide hydroxide as active ingredient after the composition is used as desulfurizer.

Comparing with existing technology, the advantages of the invention are summarized below:

1. With the two regeneration methods in this invention, the amorphous iron oxide hydroxide can regenerate fast after being used as a desulfurizer. The regenerated product still has high sulfur capacity. The regenerated product can be regenerated again to recycle, so it helps with environmental protection and economic significance through saving resources and reducing waste agent.

2. The method for generating amorphous iron oxide hydroxide further produces elemental sulfur, which optimizes resource utilization.

3. Washing the waste mixture with water prior to grinding can effectively remove impurities that cover the surface of the waste mixture so as not to affect the subsequent reaction.

4. In the regeneration methods in this invention, oxidation of the suspension by the gas containing oxygen is controllable and has good effects; the weight percent of the solid in the suspension is preferably between 10 and 15%, which guarantees the oxidation speed and complete oxidation.

5. In the two regeneration methods of this invention, beneficiating flotation method in mining field is applied to desulfurization field. The separation of amorphous iron oxide hydroxide from elemental sulfur by flotation is achieved by charging the slurry with air and is purely a physical method. This method is economical and environmentally friendly.

6. In the two regeneration methods of this invention, the waste mixture is ground into particles of size 100-400 mesh (particularly 200 mesh), which improves oxidation, extraction, and flotation separation.

7. The regeneration methods in this invention are suitable for regenerating both amorphous iron oxide hydroxide and composition comprising amorphous iron oxide hydroxide as active ingredient, which has wide utilization.

DETAILED DESCRIPTION OF THE EMBODIMENTS

To illustrate the invention, experiments detailing the method for preparing a composition comprising amorphous iron oxide hydroxide, a desulfurizer, and a preparation method thereof, as well as a desulfurizer regeneration method, are described below. It should be noted that the following examples are intended to describe and not to limit the invention.

Example 1

The process for preparing amorphous iron oxide hydroxide comprises the following steps:

Solid $Fe(NO_3)_2.6H_2O$ was prepared into solution and placed in reaction tank and then solid NaOH was put into the reaction tank and the mixture was stirred simultaneously. The reaction temperature was kept at 30-40° C. through controlling the speed of feeding NaOH and the pH value of mixed solution reached 7.5 at the end of reaction. Then the solution was filtered and filter cake was washed until the weight proportion of $Na^+$ in the filter cake less than 0.5%. The filter cake was prepared into suspension, in which the weight proportion of solid is 10%. Then air was fed into the suspension for oxidation until the weight proportion of $Fe^{2+}/Fe_t$ less than 1%. Then the solution was filtered and the resultant solid was dried at 80° C. to yield a composition comprising amorphous iron oxide hydroxide (composition A). In the composition, the weight percent of amorphous iron oxide hydroxide was 100%, with a sulfur capacity of 62%.

$Fe_t$ in this example was the total content of elemental Ferrum. $Fe^{2+}/Fe_t$ was analysed through phenanthroline spectrophotometry. The content of $Na^+$ was analysed through flame spectrometry. The following examples are the same.

The content of solid hydroxide or the ratio of two materials was controlled through controlling the pH value of solution in this example. The following examples are the same.

The process for regeneration of the composition A after being used for desulfurization was described as below:

Composition A was added to a desulfurization reactor. After $H_2S$ passing through the reactor, the resultant waste mixture was washed with water and ground in the presence of water using a wet ball mill into powders with a particle size of 300 mesh. An aqueous suspension of the powders was prepared with a solid weight percent of 15%, compressed air was charged into the suspension, and a sample was collected for testing. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid. The solid was added to a flotation tank. Water was added, and water glass and kerosene were added as auxiliary agents, and air was charged into the slurry. Due to hydrophobicity, the elemental sulfur was removed by overflowing the tank. The precipitate in the bottom of the tank was a composition comprising amorphous iron oxide hydroxide. The composition was roasted and could be reused as a desulfurizer. The composition had a sulfur capacity of 59%. After second, third, and fourth rounds of regeneration, the composition had a sulfur capacity of 58%, 56%, and 54%, respectively.

The auxiliary agent was helpful for floatation of elemental sulfur, separating amorphous iron oxide hydroxide and elemental sulfur well. Following examples was the same.

Example 2

The process for preparing the composition containing amorphous iron oxide hydroxide comprises the following steps:

152 g solid $FeSO_4.7H_2O$ was prepared into solution and placed in reaction tank and then 45 g NaOH solid was put into the reaction tank and the mixture was stirred simultaneously. Reaction temperature was kept not exceeding 50° C. through controlling the speed of feeding NaOH. After the reaction, the solution was filtered and filter cake was washed until the weight proportion of $Na^+$ in the filter cake less than 0.5%. The filter cake was prepared into suspension, in which the weight proportion of solid is 30%. Then air was fed into the suspension for oxidation until the weight proportion of $Fe^{2+}/Fe_t$ less than 1%. Then the solution was filtered and the resultant solid was dried at 90° C. to yield a composition comprising amorphous iron oxide hydroxide (composition B). In the composition, the weight percent of amorphous iron oxide hydroxide was 85% and the other ingredients comprised $NaSO_4$, water, and $TiO_2$ ($TiO_2$ is impurity in $FeSO_4.7H_2O$, the following examples are the same), with a sulfur capacity of 53%.

The process for regeneration of the composition B after being used for desulfurization was described as below:

Composition B was added to a desulfurization reactor. After $H_2S$ passing through the reactor, the resultant waste mixture was washed with water and ground in the presence of water using a wet ball mill into powders with a particle size of 100 mesh. An aqueous suspension of the powders was prepared with a solid weight percent of 5%, compressed air was charged into the suspension, and a sample was collected for testing. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was added to a flotation tank. Water were added, and air was charged into the slurry. Due to hydrophobicity, the elemental sulfur was removed by overflowing the tank. The precipitate in the bottom of the tank was a composition comprising amorphous iron oxide hydroxide. The composition was roasted and could be reused as a desulfurizer. The composition had a sulfur capacity of 52%. After second, third, and fourth rounds of regeneration, the composition had a sulfur capacity of 50%, 48%, and 46%, respectively.

Example 3

The process for preparing the composition containing amorphous iron oxide hydroxide comprises the following steps:

127 g FeCl$_2$.4H$_2$O was prepared into solution and placed in reaction tank and then 72 g solid KOH was put into the reaction tank and the mixture was stirred simultaneously. The reaction temperature was kept not exceeding 50° C. through controlling the speed of feeding KOH. After the reaction, the solution was filtered and filter cake was washed until the weight proportion of K$^+$ in the filter cake was less than 0.5%. The filter cake was prepared into suspension, in which the weight proportion of solid is 15%. Then air was fed into the suspension for oxidation until the weight proportion of Fe$^{2+}$/Fe$_t$ was less than 1%. Then the solution was filtered and the resultant solid was dried at 100° C. to yield a composition comprising amorphous iron oxide hydroxide (composition C). In the composition, the weight percent of amorphous iron oxide hydroxide was 81% and the other ingredients comprised KCl, water and impurity unknown, with a sulfur capacity of 50%. The content of K$^+$ was analysed through flame spectrometry. The following examples are the same.

The process for regeneration of the composition C after being used for desulfurization is described as below:

Composition C was added to a desulfurization reactor. After H$_2$S passing through the reactor, the resultant waste mixture was washed with water and ground in the presence of water using a wet ball mill into powders with a particle size of 200 mesh. An aqueous suspension of the powders was prepared with a solid weight percent of 10%, compressed air was charged into the suspension, and a sample was collected for testing. When no H$_2$S was produced from the reaction between the sample and hydrochloric acid, the iron sulfide in the suspension was determined to have been completely transformed into a slurry comprising amorphous iron oxide hydroxide and elemental sulfur. The slurry was added to a flotation tank. Water was added, and water glass and kerosene were added as auxiliary agents, and air was charged into the slurry. Due to hydrophobicity, the elemental sulfur was removed by overflowing the tank. The precipitate in the bottom of the tank was a composition comprising amorphous iron oxide hydroxide. The composition was roasted and could be reused as a desulfurizer. The composition had a sulfur capacity of 48%. After second, third, and fourth rounds of regeneration, the composition had a sulfur capacity of 46.5%, 45%, and 44%, respectively.

Example 4

The process for preparing the composition containing amorphous iron oxide hydroxide comprises the following steps:

Solid FeCl$_2$ was prepared into solution and placed in reaction tank and then solid Ca(OH)$_2$ was put into the reaction tank and the mixture was stirred simultaneously. The reaction temperature was kept at 40-50° C. through controlling the speed of feeding Ca(OH)$_2$ and pH value of mixed solution is 8 at the end of reaction. Then the solution was filtered and filter cake was washed until the weight proportion of Cl$^-$ in the filter cake less than 0.5%. The filter cake was prepared into suspension, in which the weight proportion of solid is 5%. Then air was fed into the suspension for oxidation until the weight proportion of Fe$^{2+}$/Fe$_t$ less than 1%. Then the solution was filtered and the resultant solid was dried at 70° C. to yield a composition comprising amorphous iron oxide hydroxide (composition D). In the composition, the weight percent of amorphous iron oxide hydroxide was 92% and the other ingredients comprised CaCl$_2$ and water, with a sulfur capacity of 57%. Wherein, the content of Cl$^-$ was analysed through mercuric thiocyanate colorimetry.

The process for regeneration of the composition D after being used for desulfurization was described as below:

Composition D was added to a desulfurization reactor. After H$_2$S passing through the reactor, the resultant waste mixture was washed with water and ground in the presence of water using a wet ball mill into powders with a particle size of 400 mesh. An aqueous suspension of the powders was prepared with a solid weight percent of 30%, compressed air was charged into the suspension, and a sample was collected for testing. When no H$_2$S was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid. The solid was added to a flotation tank. Water was added, and water glass and kerosene were added as auxiliary agents, and air was charged into the slurry. Due to hydrophobicity, the elemental sulfur was removed by overflowing the tank. The precipitate in the bottom of the tank was a composition comprising amorphous iron oxide hydroxide. The composition was roasted and could be reused as a desulfurizer. The composition had a sulfur capacity of 55%. After second, third, and fourth rounds of regeneration, the composition had a sulfur capacity of 54%, 52%, and 50%, respectively.

Example 5

The process for preparing the composition containing amorphous iron oxide hydroxide comprises the following steps:

Solid Fe(NO$_3$)$_2$.6H$_2$O was prepared into solution and placed in reaction tank and then solid KOH was put into the reaction tank and the mixture was stirred simultaneously. Reaction temperature was kept at 50-60° C. through controlling the speed of feeding KOH and pH value of mixed solution is 8 at the end of reaction. Then the solution was filtered and filter cake was washed until the weight proportion of K$^+$ in the filter cake less than 0.5%. The filter cake was prepared into suspension, in which the weight proportion of solid is 12%. Then air was fed into the suspension for oxidation until the weight proportion of Fe$^{2+}$/Fe$_t$ was less than 1%. Then the solution was filtered and the resultant solid was dried at 50° C. to yield a composition comprising amorphous iron oxide hydroxide(composition E).

500 g composition comprising amorphous iron oxide hydroxide, 35 g sesbania powder as binder and 20 g sawdust as additive were mixed uniformly, kneaded with appropriate quantities of water using a small kneader, and extruded using a small twin screw extruder to yield a strip. The desulfurizer was roasted at 80° C. for 4 h, and the sulfur capacity thereof was measured to be 47%. The desulfurizer was named desulfurizer E.

The process for regeneration of the composition E after being used for desulfurization was described as below:

The desulfurizer E was added to a desulfurization reactor. After H$_2$S passing through the reactor, the resultant waste mixture was washed with water and ground in the presence of water using a wet ball mill into powders of particle size 200 mesh. An aqueous suspension of the powders was prepared with a solid weight percent of 15%. Compressed air was charged into the slurry and a sample was collected for testing. When no H$_2$S was produced from the reaction between the sample and hydrochloric acid, the iron sulfide in the suspension was determined to have been completely transformed into a slurry comprising amorphous iron oxide hydroxide and elemental sulfur. The slurry was placed in a flotation tank, water was added, and air was charged. The elemental sulfur, sesbania powder and sawdust were removed, together with excess air, by overflowing the tank. The precipitate in the bottom of the tank was a composition comprising amorphous iron oxide hydroxide. The composition comprising amorphous iron oxide hydroxide was roasted at 70° C., and sesbania powder and sawdust were added according to the proportions described above. The mixture was treated in accordance with the method and reaction conditions described above to yield a new desulfurizer (desulfurizer E') with a sulfur capacity of 46%.

The desulfurizer E' was used to desulfurize and was regenerated according to the process described for the desulfurizer E. A new desulfurizer (desulfurizer E") with a sulfur capacity of 44% was obtained.

After three rounds of desulfurizing and regenerating, the fourth desulfurizer generated (desulfurizer E''') had a sulfur capacity of 42%.

After four rounds of desulfurizing and regenerating, the fifth desulfurizer generated (desulfurizer E'''') had a sulfur capacity of 40%.

Example 6

The process for preparing the composition containing amorphous iron oxide hydroxide comprises the following steps:

Solid $FeSO_4.7H_2O$ was prepared into solution and placed in reaction tank and then solid NaOH was put into the reaction tank and the mixture was stirred simultaneously. Reaction temperature was kept not exceeding 50° C. through controlling the speed of feeding NaOH and pH value of mixed solution is 8 at the end of reaction. Then the solution was filtered and filter cake was washed until the weight proportion of $Na^+$ in the filter cake less than 0.5%. The filter cake was prepared into suspension, in which the weight proportion of solid is 20%. Then air was fed into the suspension for oxidation until the weight proportion of $Fe^{2+}/Fe_t$ was less than 1%. Then the solution was filtered and the resultant solid was dried at 40° C. to yield a composition comprising amorphous iron oxide hydroxide (composition F).

500 g composition F comprising amorphous iron oxide hydroxide, 35 g sesbania powder as binder and 20 g rice hull powder as additive were mixed uniformly, kneaded with appropriate quantities of water using a small kneader, and extruded using a small twin screw extruder to yield a strip. The desulfurizer was roasted at 70° C. for 6 h, and the sulfur capacity thereof was measured to be 45%. The desulfurizer was named desulfurizer F.

The process for regeneration of the composition F after being used for desulfurization was described as below:

The desulfurizer F was added to a desulfurization reactor. After $H_2S$ passing through the reactor, the resultant waste mixture was washed with water and ground in the presence of water using a wet ball mill into powders of particle size 200 mesh. An aqueous suspension of the powders was prepared with a solid weight percent of 25%. Compressed air was charged into the slurry and a sample was collected for testing. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was placed in a flotation tank, water was added, and air was charged. The elemental sulfur, cellulose powder and rice hull powder were removed, together with excess air, by overflowing the tank. The precipitate in the bottom of the tank was a composition comprising amorphous iron oxide hydroxide. The composition comprising amorphous iron oxide hydroxide was roasted at 80° C., and cellulose powder and rice hull powder were added according to the proportions described above. The mixture was treated in accordance with the method and reaction conditions described above to yield a new desulfurizer (desulfurizer F') with a sulfur capacity of 44%.

The desulfurizer F' was used to desulfurize and was regenerated according to the process described for the desulfurizer F. A new desulfurizer (desulfurizer F") with a sulfur capacity of 42.5% was obtained.

After three rounds of desulfurizing and regenerating, the fourth desulfurizer generated (desulfurizer F''') had a sulfur capacity of 40%.

After four rounds of desulfurizing and regenerating, the fifth desulfurizer generated (desulfurizer F'''') had a sulfur capacity of 38%.

Example 7

The process for preparing the composition containing amorphous iron oxide hydroxide comprises the following steps:

Solid $Fe(NO_3)_2.6H_2O$ was prepared into solution and placed in reaction tank and then solid NaOH was put into the reaction tank and the mixture was stirred simultaneously. Reaction temperature was kept at 30-40° C. through controlling speed of the feeding NaOH and pH value of mixed solution reached 7.5 at the end of reaction. Then the solution was filtered and filter cake was washed until the weight proportion of $Na^+$ in the filter cake less than 0.5%. The filter cake was prepared into suspension, in which the weight proportion of solid is 10%. Then air was fed into the suspension for oxidation until the weight proportion of $Fe^{2+}/Fe_t$ was less than 1%. Then the solution was filtered and the resultant solid was dried at 80° C. to yield a composition comprising amorphous iron oxide hydroxide (composition G). In the composition, the weight percent of amorphous iron oxide hydroxide was 100%, with a sulfur capacity of 62%.

$Fe_t$ in this example is the total content of elemental Ferrum. $Fe^{2+}/Fe_t$ was analysed through phenanthroline spectrophotometry. The content of $Na^+$ was analysed through flame spectrometry. The following examples are the same.

The content of hydroxide solid or the ratio of two materials is controlled through controlling the pH value of solution in this example. The following examples are the same.

The process for regeneration of the composition G after being used for desulfurization was described as below:

The desulfurizer G was added to a desulfurization reactor. After $H_2S$ passing through the reactor, the resultant waste mixture was washed with water and ground in the presence of water using a wet ball mill into powders of particle size 300 mesh. An aqueous suspension of the powders was prepared with a solid weight percent of 15%. Compressed air was charged into the suspension and a sample was collected for testing. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was extracted thrice with $CCl_4$. The extract was combined and distilled to yield crystallized elemental sulfur. The solid remaining after extraction was a composition comprising amorphous iron oxide hydroxide. The composition was roasted and could be reused as a desulfurizer. The composition had a sulfur capacity of 59%. After second, third, and fourth rounds of regeneration, the composition had a sulfur capacity of 58%, 56%, and 54%, respectively.

Example 8

The process for preparing the composition containing amorphous iron oxide hydroxide comprises the following steps:

152 g solid $FeSO_4 \cdot 7H_2O$ solid was prepared into solution and placed in reaction tank and then 45 g solid NaOH solid was put into the reaction tank and the mixture was stirred simultaneously. Reaction temperature was kept not exceeding 50° C. through controlling speed of feeding NaOH. After the reaction, the solution was filtered and filter cake was washed until the weight proportion of $Na^+$ in the filter cake less than 0.5%. The filter cake was prepared into suspension, in which the weight proportion of solid is 30%. Then air was fed into the suspension for oxidation until the weight proportion of $Fe^{2+}/Fe_t$ less than 1%. Then the solution was filtered and the resultant solid was dried at 90° C. to yield a composition comprising amorphous iron oxide hydroxide (composition H). In the composition, the weight percent of amorphous iron oxide hydroxide was 85% and the other ingredients comprised $NaSO_4$, water, and $TiO_2$ ($TiO_2$ is impurity in $FeSO_4 \cdot 7H_2O$, the following examples are the same), with a sulfur capacity of 53%.

The process for regeneration of the composition H after being used for desulfurization was described as below:

To a desulfurization reactor was added composition H. After passing $H_2S$ through the reactor, the resultant waste mixture was washed with water and ground in the presence of water using a wet ball mill into powders of particle size 100 mesh. An aqueous suspension of the powders was prepared with a solid weight percent of 5%. Compressed air was charged into the suspension and a sample was collected for testing. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CCl_4$. The extract was combined and distilled to yield crystallized elemental sulfur. The solid remaining after extraction was a composition comprising amorphous iron oxide hydroxide. The composition was roasted and could be reused as a desulfurizer. The composition had a sulfur capacity of 50%. After second, third, and fourth rounds of regeneration, the composition had a sulfur capacity of 48%, 46%, and 44%, respectively.

Example 9

The process for preparing the composition containing amorphous iron oxide hydroxide comprises the following steps:

127 g $FeCl_2 \cdot 4H_2O$ was prepared into solution and placed in reaction tank and then 72 g solid KOH solid was put into the reaction tank and the mixture was stirred simultaneously. Reaction temperature was kept not exceeding 50° C. through controlling speed of feeding KOH. After the reaction, the solution was filtered and filter cake was washed until the weight proportion of $K^+$ in the filter cake less than 0.5%. The filter cake was prepared into suspension, in which the weight proportion of solid is 15%. Then air was fed into the suspension for oxidation until the weight proportion of $Fe^{2+}/Fe_t$ less than 1%. Then the solution was filtered and the resultant solid was dried at 100° C. to yield a composition comprising amorphous iron oxide hydroxide (composition I). In the composition, the weight percent of amorphous iron oxide hydroxide was 81% and the other ingredients comprised KCl, water and impurity unknown, with a sulfur capacity of 50%. The content of $K^+$ was analysed through flame spectrometry. The following examples are the same.

The process for regeneration of the composition I after being used for desulfurization was described as below:

The desulfurizer I was added to a desulfurization reactor. After $H_2S$ passing through the reactor, the resultant waste mixture was washed with water and ground in the presence of water using a wet ball mill into powders of particle size 200 mesh. An aqueous suspension of the powders was prepared with a solid weight percent of 10%. Compressed air was charged into the suspension and a sample was collected for testing. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CS_2$. The extract was combined and distilled to yield crystallized elemental sulfur. The solid remaining after extraction was a composition comprising amorphous iron oxide hydroxide. The composition was roasted and could be reused as a desulfurizer. The composition had a sulfur capacity of 48%. After second, third, and fourth rounds of regeneration, the composition had a sulfur capacity of 46%, 44.5%, and 42%, respectively.

Example 10

The process for preparing the composition containing amorphous iron oxide hydroxide comprises the following steps:

Solid $FeCl_2$ solid was prepared into solution and placed in reaction tank and then $Ca(OH)_2$ solid was put into the reaction tank and the mixture was stirred simultaneously. Reaction temperature was kept at 40-50° C. through controlling the speed of feeding $Ca(OH)_2$ and pH value of mixed solution is 8 at the end of reaction. Then the solution was filtered and filter cake was washed until the weight proportion of $Cl^-$ in the filter cake was less than 0.5%. The filter cake was prepared into suspension, in which the weight proportion of solid is 5%. Then air was fed into the suspension for oxidation until the weight proportion of $Fe2+/Fe_t$ less than 1%. Then the solution was filtered and the resultant solid was dried at 70° C. to yield a composition comprising amorphous iron oxide hydroxide (composition J). In the composition, the weight percent of amorphous iron oxide hydroxide was 92% and the other ingredients comprised $CaCl_2$ and water, with a sulfur capacity of 57%. Wherein, the content of $Cl^-$ was analysed through mercuric thiocyanate colorimetry.

The process for regeneration of the composition J after being used for desulfurization was described as below:

The desulfurizer J was added to a desulfurization reactor. After $H_2S$ passing through the reactor, the resultant waste mixture was washed with water and ground in the presence of water using a wet ball mill into powders of particle size 400 mesh. An aqueous suspension of the powders was prepared with a solid weight percent of 30%. Compressed air was charged into the suspension and a sample was collected for testing. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CS_2$. The extract was combined and distilled to yield crystallized elemental sulfur. The solid remaining after extraction was a composition comprising amorphous iron oxide hydroxide. The composition was roasted and could be reused as a desulfurizer. The composition had a sulfur capacity of 55%. After second, third, and fourth rounds of regeneration, the composition had a sulfur capacity of 53%, 50%, and 48%, respectively.

Example 11

The process for preparing the composition containing amorphous iron oxide hydroxide comprises the following steps:

Solid $Fe(NO_3)_2 \cdot 6H_2O$ solid was prepared into solution and placed in reaction tank and then solid KOH solid was put into the reaction tank and the mixture was stirred simultaneously. Reaction temperature was kept at 50-60° C. through controlling speed of feeding KOH and pH value of mixed solution is 8 at the end of reaction. Then the solution was filtered and filter cake was washed until the weight proportion of $K^+$ in the filter cake less than 0.5%. The filter cake was prepared into suspension, in which the weight proportion of solid is 12%. Then air was fed into the suspension for oxidation until the weight proportion of $Fe^{2+}/Fe_t$ less than 1%. Then the solution was filtered and the resultant solid was dried at 50° C. to yield a composition comprising amorphous iron oxide hydroxide (composition K).

500 g composition K comprising amorphous iron oxide hydroxide, 35 g sesbania powder as binder and 20 g sawdust as additive were mixed uniformly, kneaded with appropriate quantities of water using a small kneader, and extruded using a small twin screw extruder to yield a strip. The desulfurizer was roasted at 80° C. for 4 h, and the sulfur capacity thereof was measured to be 47%. The desulfurizer was named desulfurizer K.

The process for regeneration of the composition K after being used for desulfurization was described as below:

The desulfurizer K was added to a desulfurization reactor. After $H_2S$ passing through the reactor, the resultant waste mixture was washed with water and ground in the presence of water using a wet ball mill into powders of particle size 200 mesh. An aqueous suspension of the powders was prepared with a solid weight percent of 15%, compressed air was charged, and a sample was collected for testing. When no $H_2S$ was produced from the reaction between the sample and hydrochloric acid, the iron sulfide in the suspension was determined to be completely transformed into a slurry comprising amorphous iron oxide hydroxide and elemental sulfur. The slurry was filtered to yield a solid that was extracted thrice with $CCl_4$. The extract was combined and distilled to yield crystallized elemental sulfur. The remaining solid after extraction was a composition comprising amorphous iron oxide hydroxide. The composition comprising amorphous iron oxide hydroxide was roasted at 70° C., and sesbania powder and sawdust were added according to the proportions described above. The mixture was treated according to the method and reaction conditions described above to yield a new desulfurizer (desulfurizer K') with a sulfur capacity of 45%.

The desulfurizer K' was used for desulfurization and was regenerated according to the process described for the regeneration of desulfurizer K. A new desulfurizer (desulfurizer K") with a sulfur capacity of 43% was thereby obtained.

After three rounds of desulfurizing and regenerating, the fourth desulfurizer generated (desulfurizer K''') had a sulfur capacity of 38.5%.

After four rounds of desulfurizing and regenerating, the fifth desulfurizer generated (desulfurizer K'''') had a sulfur capacity of 35.5%.

Example 12

The process for preparing the composition containing amorphous iron oxide hydroxide comprises the following steps:

Solid $FeSO_4 \cdot 7H_2O$ solid was prepared into solution and placed in reaction tank and then solid NaOH solid was put into the reaction tank and the mixture was stirred simultaneously. Reaction temperature was kept not exceeding 50° C. through controlling speed of feeding NaOH and pH value of mixed solution is 8 at the end of reaction. Then the solution was filtered and filter cake was washed until the weight proportion of $Na^+$ in the filter cake less than 0.5%. The filter cake was prepared into suspension, in which the weight proportion of solid is 20%. Then air was fed into the suspension for oxidation until the weight proportion of $Fe^{2+}/Fe_t$ was less than 1%. Then the solution was filtered and the resultant solid was dried at 40° C. to yield a composition comprising amorphous iron oxide hydroxide (composition L).

500 g composition L comprising amorphous iron oxide hydroxide, 35 g sesbania powder as binder and 20 g rice hull powder as additive were mixed uniformly, kneaded with appropriate quantities of water using a small kneader, and extruded using a small twin screw extruder to yield a strip. The desulfurizer was roasted at 70° C. for 6 h, and the sulfur capacity thereof was measured to be 45%. The desulfurizer was named desulfurizer L.

The process for regeneration of the composition L after being used for desulfurization was described as below:

The desulfurizer L was added to a desulfurization reactor. After $H_2S$ passing through the reactor, the resultant waste mixture was washed with water and ground in the presence of water using a wet ball mill into powders of particle size 200 mesh. An aqueous suspension of the powders was prepared with a solid weight percent of 25%, compressed air was charged, and a sample was collected for testing. When no $H_2S$ was produced from the reaction between the sample and hydrochloric acid, the iron sulfide in the suspension was determined to be completely transformed into a slurry comprising amorphous iron oxide hydroxide and elemental sulfur. The slurry was filtered to yield a solid that was extracted thrice with $CS_2$. The extract was combined and distilled to yield crystallized elemental sulfur. The remaining solid after extraction was a composition comprising amorphous iron oxide hydroxide. The composition comprising amorphous iron oxide hydroxide was roasted at 80° C., and cellulose powder and rice hull powder were added according to the proportions described above. The mixture was treated according to the method and reaction conditions described above to yield a new desulfurizer (desulfurizer L') with a sulfur capacity of 43%.

The desulfurizer L' was used for desulfurization and was regenerated according to the process described for the regeneration of desulfurizer L. A new desulfurizer (desulfurizer L") with a sulfur capacity of 42% was thereby obtained.

After three rounds of desulfurizing and regenerating, the fourth desulfurizer generated (desulfurizer L''') had a sulfur capacity of 40%.

After four rounds of desulfurizing and regenerating, the fifth desulfurizer generated (desulfurizer L'''') had a sulfur capacity of 37.5%.

In the above mentioned examples, the sulfur capacity measured using a standard gas containing 40000 ppm $H_2S$ at normal temperature (−5° C. to 45° C.) and normal pressure (generally, one atmosphere pressure). Specifically, sulfur was quantitatively measured using WK-2C integrated microcoulometer (manufactured by Jiangsu Electroanalytical Instrument Factory), which had a minimal measurement volume of 0.2 ppm.

The embodiments of the invention have showed that the regeneration method is suitable for both pure amorphous iron oxide hydroxide and amorphous iron oxide hydroxide of high purity. However, it is of little significance for composition comprising amorphous iron oxide hydroxide lower than 40% in weight content, which has impurity and low desulfurization capacity after regenerating. Additionally, the regeneration method in the invention is suitable for any other desulfurizer comprising amorphous iron oxide hydroxide besides desulfurizer comprising amorphous iron oxide hydroxide, binder and additive in embodiments.

While particular embodiments of the invention have been shown and described, it will be obvious to those skilled in the art that changes and modifications may be made without departing from the invention in its broader aspects, and therefore, the aim in the appended claims is to cover all such changes and modifications that fall within the true spirit and scope of the invention.

The invention claimed is:

1. A method for regenerating amorphous iron oxide hydroxide after being used as a desulfurizer, the method comprising the following steps:
   (1) grinding a waste mixture into waste powder, wherein the waste mixture results from use of the amorphous iron oxide hydroxide as a desulfurizer;
   (2) preparing the waste powder into a suspension and charging the suspension with a gas comprising oxygen to obtain a slurry comprising the amorphous iron oxide hydroxide and elemental sulfur; and
   (3) placing the slurry or a solid resulting from filtering the slurry into a container and charging the slurry or the solid with air so that the elemental sulfur floats and the amorphous iron oxide hydroxide precipitates.

2. The method of claim 1, wherein prior to grinding, the waste mixture is washed with water.

3. The method of claim 1, wherein the floated elemental sulfur is separated after step (3).

4. The method of claim 1, wherein the weight proportion of the waste powder in the suspension is 5-30%.

5. The method of claim 4, wherein the weight proportion of the waste powder in the suspension is 10-15%.

6. The method of claim 1, wherein the gas comprising oxygen is air.

7. The method of claim 1, wherein an auxiliary agent is added to the container to accelerate the floating of the elemental sulfur in step (3).

8. The method of claim 7, wherein the auxiliary agent is water glass and kerosene.

9. The method of claim 1, wherein the container in step (3) is a flotation tank.

10. The method of claim 1, wherein the waste mixture is ground into particles of size 100-400 mesh in step (1).

11. The method of claim 10, wherein the waste mixture is ground into particles of size 200 mesh.

12. The method of claim 1, wherein the method is used to regenerate a desulfurizer comprising amorphous iron oxide hydroxide as an active ingredient after the desulfurizer is used to remove sulfur through formation of iron sulfide.

13. A method of regenerating amorphous iron oxide hydroxide after being used as a desulfurizer, the method comprising the following steps:
   (a) grinding a waste mixture into a waste powder, wherein the waste mixture results from use of the amorphous iron oxide hydroxide as a desulfurizer;
   (b) preparing the waste powder into a suspension and charging the suspension with a gas containing comprising oxygen to obtain a slurry comprising the amorphous iron oxide hydroxide and elemental sulfur; and
   (c) filtering the slurry to yield a solid and extracting the elemental sulfur from the solid with a solvent to yield the amorphous iron oxide hydroxide.

14. The method of claim 13, wherein prior to grinding, the waste mixture is washed with water.

15. The method of claim 13, wherein the elemental sulfur is separated after the solvent is concentrated.

16. The method of claim 13, wherein the weight proportion of the waste powder in the suspension is 5-30%.

17. The method of claim 16, wherein the weight proportion of the waste powder in the suspension is 10-15%.

18. The method of claim 13, wherein the gas comprising oxygen is air.

19. The method of claim 13, wherein the solvent is a non-polar solvent.

20. The method of claim 19, wherein the non-polar solvent is carbon tetrachloride or carbon disulfide.

21. The method of claim 13, wherein the waste mixture is ground into particles of size 100-400 mesh.

22. The method of claim 21, wherein the waste mixture is ground into particles of size 200 mesh.

23. The method of claim 13, wherein the method is used to regenerate a desulfurizer comprising amorphous iron oxide hydroxide as an active ingredient after the desulfurizer is used to remove sulfur through formation of iron sulfide.

* * * * *